US010371268B2

(12) United States Patent
Peirsman et al.

(10) Patent No.: US 10,371,268 B2
(45) Date of Patent: Aug. 6, 2019

(54) STOPCOCK FOR BEVERAGE DISPENSER

(71) Applicant: Anheuser-Busch InBev S.A., Brussels (BE)

(72) Inventors: Daniel Peirsman, Leuven (BE); Stijn Vandekerckhove, Leuven (BE); Johan Van Rompaey, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 15/544,877

(22) PCT Filed: Jan. 19, 2016

(86) PCT No.: PCT/EP2016/050969
§ 371 (c)(1),
(2) Date: Jul. 19, 2017

(87) PCT Pub. No.: WO2016/116422
PCT Pub. Date: Jul. 28, 2016

(65) Prior Publication Data
US 2018/0003303 A1    Jan. 4, 2018

(30) Foreign Application Priority Data
Jan. 21, 2015    (EP) .................................... 15151899

(51) Int. Cl.
*F16K 5/04*         (2006.01)
*B67D 1/14*         (2006.01)
(Continued)

(52) U.S. Cl.
CPC .......... *F16K 5/0478* (2013.01); *B67D 1/1444* (2013.01); *B67D 3/047* (2013.01);
(Continued)

(58) Field of Classification Search
CPC .... F16K 5/0407; F16K 5/0414; F16K 5/0457; F16K 5/0478; B67D 1/1444; B67D 3/047
See application file for complete search history.

(56) References Cited

U.S. PATENT DOCUMENTS

| 2,493,966 A | * | 1/1950 | Hartley | ................. F16K 5/0478 251/285 |
| 2,547,116 A | * | 4/1951 | Gould | ................... F16K 5/0478 251/297 |

(Continued)

FOREIGN PATENT DOCUMENTS

| DE | 25 04 914 | 8/1976 | |
| DE | 102007013905.7 | * 10/2008 | ............... F16K 5/04 |

(Continued)

OTHER PUBLICATIONS

ASTM Designation D2240, "Standard Test Method for Rubber Property—Durometer Hardness," Abstract (Aug. 1, 2015).

*Primary Examiner* — J C Jacyna
(74) *Attorney, Agent, or Firm* — Levy & Grandinetti

(57) ABSTRACT

A stopcock controls the flow of a liquid under pressure through a dispensing tube with an upstream portion separated by the stopcock from a downstream portion. The stopcock includes a housing portion with a chamber defined by a housing peripheral wall surrounding a longitudinal z-axis. The housing peripheral wall has an inner surface of revolution with a housing inlet opening connectable to the upstream portion of the dispensing tube. The stopcock includes an outlet connector connectable to the downstream portion of the dispensing tube and comprising an outlet opening. A plug defined by a plug outer peripheral wall snugly fitting the inner surface of revolution of the housing peripheral wall. The plug can rotate within the chamber about the longitudinal z-axis. The plug has a through-channel extending from an upstream opening located on the (Continued)

plug outer peripheral wall, to a downstream opening, such that the plug can be rotated about the longitudinal z-axis from a flow position to a sealed position, wherein, the plug outer peripheral wall comprises a seal protrusion topped by a ridge and forming a closed loop defining a blank area of the plug outer peripheral wall, such that, in the sealed position, the housing inlet opening of the housing peripheral wall faces the blank area and is circumscribed within the seal protrusion. The plug outer peripheral wall has a flow protrusion topped by a ridge circumscribing the upstream opening such that, in the flow position, the inlet opening of the cylindrical chamber peripheral wall is circumscribed by the flow protrusion, wherein said flow protrusion preferably shares a common portion of protrusion with the seal protrusion.

11 Claims, 8 Drawing Sheets

(51) Int. Cl.
  *B67D 3/04* (2006.01)
  *B29C 45/16* (2006.01)
  *B29K 101/12* (2006.01)
  *B29L 31/56* (2006.01)
  *B67D 1/04* (2006.01)
  *B67D 1/08* (2006.01)

(52) U.S. Cl.
  CPC ........ *F16K 5/0407* (2013.01); *B29C 45/1676* (2013.01); *B29K 2101/12* (2013.01); *B29K 2995/007* (2013.01); *B29L 2031/565* (2013.01); *B67D 1/0425* (2013.01); *B67D 1/0857* (2013.01); *F16K 5/0414* (2013.01)

(56) References Cited

U.S. PATENT DOCUMENTS

| | | | | |
|---|---|---|---|---|
| 3,133,723 | A | * | 5/1964 | Goldman ............... F16K 5/0478 251/309 |
| 4,844,413 | A | * | 7/1989 | Weber ................... F16K 5/0478 251/314 |
| 2002/0084437 | A1 | * | 7/2002 | Nitsche ................. F16K 5/0414 251/309 |
| 2005/0211579 | A1 | * | 9/2005 | Makita ............... B65D 51/2842 206/219 |

FOREIGN PATENT DOCUMENTS

| | | |
|---|---|---|
| EP | 2 923 998 | 9/2015 |
| EP | 2 987 767 | 2/2016 |
| FR | 1290315 | 4/1962 |
| JP | 2015-86980 | * 5/2015 |
| WO | WO 99/47451 | 9/1999 |
| WO | WO 01/86113 | 11/2001 |
| WO | WO 2004/018915 | 3/2004 |
| WO | WO 2007/108684 | 9/2007 |
| WO | WO 2007/12003 | 10/2007 |
| WO | WO 2008/129012 | 10/2008 |
| WO | WO 2008/129013 | 10/2008 |
| WO | WO 2008/129015 | 10/2008 |
| WO | WO 2008/129016 | 10/2008 |
| WO | WO 2008/129018 | 10/2008 |
| WO | WO 2012/062609 | 5/2012 |
| WO | WO 2013/164258 | 11/2013 |
| WO | WO 2014/057099 | 4/2014 |

* cited by examiner

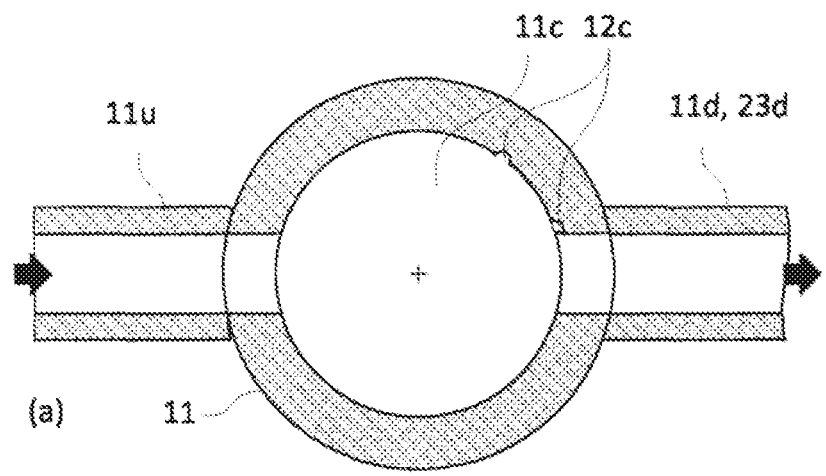
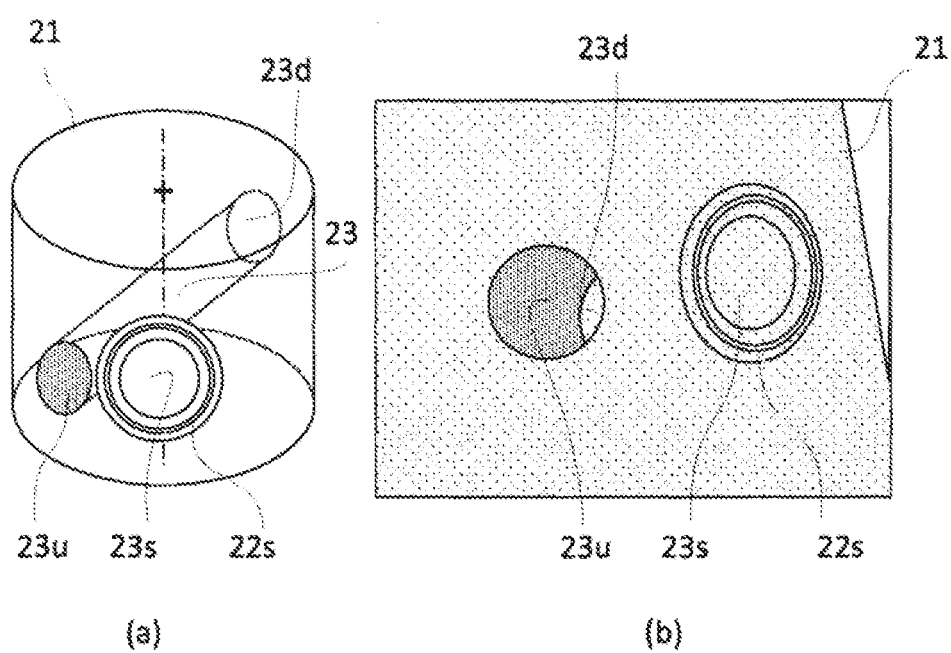
FIG. 3
PRIOR ART
FIG. 4
PRIOR ART

STOPCOCK FOR BEVERAGE DISPENSER

TECHNICAL FIELD

The present invention concerns a stopcock for controlling the flow of a pressurized liquid through a dispensing tube, in particular in a beverage dispensing appliance for dispensing beer and other fermented beverages. The stopcock of the present invention can be disposable and must therefore be simple, reliable, and cheap to produce.

BACKGROUND OF THE INVENTION

When beer or malt based fermented beverages (collectively referred to herein as "beer") and fermented beverages in general, such as cider, are widely distributed stored in bottles and metal cans, there is a marked preference by the public for beers served directly on tap from a keg, referred to as draught (or draft) beer. Since draught beer was traditionally served in large volumes in public houses (pubs) and restaurants, large capacity metal kegs were traditionally used, typically 50 l kegs (=11 Imperial gallons). In recent years, however; a reduction of the kegs capacity offered on the market has been observed. There are two main factors explaining this trend.

First, brewers have developed various solutions for offering draught beer to particulars with specifically designed home appliances. It is clear that if 50 l kegs can be emptied reasonably rapidly in a pub, this is not the case for home appliances. Hence, smaller kegs of 5 to 15 l capacity were developed. Such home appliances are often referred to as "table top dispensers" or "counter top dispensers" because they are small enough to stand on top of a table or a counter.

Second, even in pubs, the tastes of the consumers have shifted from traditional lager beers towards special beers, with more specific flavours. This diversification of the types of beers offered for consumption in pubs has pushed brewers to store their special beers in smaller capacity kegs, ranging from 8 to 25 l kegs. Though counter top dispensers are often used with kegs of up to 15 l capacity, larger kegs of up to the order of 18 or 25 l capacity are too large to stand on top of a counter, and probably too small to justify storing them in a basement far away from the tap, they are usually stored directly under the tapping column, usually in a refrigerated chamber. For this reason and by opposition to the expression "table top dispensers", such dispensing systems used in pubs are often referred to as "under the counter dispensers".

With the reduction of kegs capacity, however, the cost of packaging (i.e. cost of keg per liter of beer sold) increased accordingly. Alternative solutions to metal kegs had to be developed, typically replacing metal kegs by polymeric kegs made for example of PET. Furthermore, since draught beers require a pressurized gas to drive the dispensing of the beer out of the keg, and pressurized $CO_2$ bottles used in pubs are not readily available or not practical for home appliances, solutions were proposed to use air compressors as source of pressurized gas instead. To avoid any contact between air and beer, dispensing bag-in-containers have been used, wherein the beer is contained in a flexible inner bag contained in an outer, rigid container, and pressurized gas is injected into the space between the inner bag and outer container to collapse the inner bag and drive the beer out of the bag. As illustrative examples, integrally blowmoulded polymeric dispensing bag-in-containers are disclosed in WO2008129018, WO2008129016, WO2008129012, WO2008129015, or WO2008129013, which contents are herein incorporated by reference.

Regardless of its size, before use a beer keg must be connected to a dispensing line and to a source of pressurized gas. Home appliances have been designed with their own specific solution for rapidly connecting a dispensing line and a gas source to the interior of the kegs (cf. e.g., WO2012056018). In some cases, the source of pressurized gas is stored in the keg itself, but this solution is rather expensive and to date implementable in quite small kegs only (cf. e.g., WO9947451, WO2007/108684). In pubs, however, although the kegs designs have changed dramatically as discussed above, the same equipment as for large 50 l kegs is often still being used downstream from the keg, including the keg connector, the dispensing tube, dispensing valve, gas duct, and draught column and tap.

With smaller kegs available with a variety of beer types, it is likely that a beer dispensing appliance will be loaded with kegs containing different types of beers more often than with larger, traditional kegs. All the elements of the dispensing appliance contacting the beer and located downstream from the keg, including the dispensing tube, the dispensing valve and, optionally, the keg connector, shall consequently be changed more often, to avoid flavours mixing between two types of beer. A dispensing tube is often provided with each new keg, so that it shall be disposed of together with the empty keg after use. In some cases, the keg is sold with the dispensing tube irreversibly coupled to the keg or, alternatively, the dispensing tube can be coupled to the keg by means of a keg connector. Traditional keg connectors are made of metal. New keg connectors are now being developed which are cheaper, simpler, and often made of polymer, such as disclosed in WO2014057099, some keg connector are even disposable such as disclosed in EP 2923998 and EP 2987767.

Beer contained in a keg is pressurized by injecting pressurized gas into the keg, either in the headspace on top of the beer level, or in the space between outer container and inner bag in bag-in-containers. The pressurized liquid flows through the dispensing tube. In order to control the flow of liquid out of the dispensing tube, a dispensing valve is used. It is generally activated by rotation of a lever at the end of a tapping column as well known in the art. Different types of dispensing valves are currently used.

A much appreciated type of valve is a pinch valve, wherein a resilient portion of the dispensing tube is inserted between two jaws which can be moved towards and away from each other to, respectively, interrupt or allow the flow of liquid through the thus pinched resilient portion of the dispensing tube. This type of valves is very appreciated because the mechanical elements of the valve never contact the liquid flowing through the dispensing tube. Examples of such pinch valves are disclosed in WO2013164258 and WO2012062609. The inconvenience with pinch valves is that they limit the choice of materials to be used for the dispensing tube to materials having sufficient flexibility and resilience to function properly with a pinch valve and the flow rate is not very accurate.

Alternatively, stopcocks (or plug valves) can be used for the control of beer flow through the dispensing tube. A stopcock comprises a plug provided with a through channel which is rotatably mounted in a housing coupled to an inlet portion and an outlet portion of a dispensing tube. The rotation of the plug brings the through channel in or out of fluid communication with the inlet and outlet portions of the dispensing tube. Stopcocks made of glass are widely used in laboratories as they afford an accurate control of the flow of a liquid. Since the liquid flows through the through-channel in the plug, a stopcock must be cleaned thoroughly after use or changed together with the dispensing tube every time a new type of beer is loaded in the dispenser, or every time the dispenser has not been used and contamination may have developed in the dispensing tube. In order to be implementable in beverage dispensers, the production cost of stopcocks must be reduced substantially.

WO2004018915 discloses a stopcock for use in medico-surgical drainage systems. A housing is injection moulded comprising a peripheral wall defining a central cylindrical portion flanked at each end by a trunco-conical portion flaring out with increasing diameter, like a thread spool. A plug is injection moulded into the cylindrical chamber and caused to shrink more than the housing, such that the trunco-conical portion of the housing peripheral wall impedes the plug to shrink uniformly. After cooling, the plug cross-section deviates from circularity. The rotation of a non-circular plug within a cylindrical central portion of the housing allows the formation of a strong contact between the walls of the plug and the housing peripheral wall which seal the stopcock. The stopcock disclosed in WO2004018915 was tested in a beverage dispenser, but the stopcock did not resist the pressures of the order of 0.5 to 1.5 bar above atmospheric, used in beverage dispensing appliances, which are much higher than the ones associated with medico-surgical drainage systems, and liquid seeped between the plug and the housing peripheral wall.

FR1290315 discloses a stopcock comprising a plug rotatingly mounted in a chamber comprising an inlet orifice and an outlet orifice. The plug comprises a through channel extending from one inlet opening to an outlet opening—both openings being located at a peripheral wall of said plug—, such that by rotation of the plug, the inlet opening and the outlet opening of the plug are brought into or out of registry with the inlet orifice and outlet orifice of the chamber, respectively. The plug peripheral wall further comprise two closed-loop shaped protrusions defining two blank areas of the peripheral wall of the plug, such that when the plug's inlet and outlet openings are out of registry with the chamber's inlet and outlet orifices, the latter two orifices face the blank areas of the plug's peripheral wall, thus ensuring a fluid tight contact between the plug and the chamber in closed position. This solution is interesting, but the problem is that with the protrusions defining the blank areas, the fluid tightness is worsened in any position wherein said protrusions do not circumscribe the chamber's inlet and outlet orifices, since said protrusion distort the rotational symmetry of the plug.

There therefore remains a need in the art for a stopcock which is reliable at the pressures typically used in beverage dispensing appliances, which is reliable and which production cost is compatible with disposable valves. The present invention proposes such stopcock. These and other advantages of the present invention are presented in the next sections.

SUMMARY OF THE INVENTION

The present invention is defined in the appended independent claims. Preferred embodiments are defined in the dependent claims. In particular, the present invention concerns a stopcock for allowing or stopping the flow of a liquid under pressure through a dispensing tube comprising an upstream portion separated from a downstream portion by the stopcock to which they are both connected, said stopcock comprising:
  (a) A housing portion comprising a chamber defined by a housing peripheral wall surrounding a longitudinal z-axis, said housing peripheral wall comprising an inner surface of revolution about said longitudinal z-axis, said housing peripheral wall comprising a housing inlet opening connectable to the upstream portion of the dispensing tube,
  (b) An outlet connector connectable to or forming the downstream portion of the dispensing tube and comprising an outlet opening;
  (c) A plug defined by a plug outer peripheral wall snugly fitting the inner surface of revolution of the housing peripheral wall, such that the plug can rotate within the chamber about said longitudinal z-axis, said plug comprising
  (d) a through-channel at least partially transverse to the longitudinal z-axis, extending from an upstream opening located on the plug outer peripheral wall, to a downstream opening, such that the plug can be rotated about the longitudinal z-axis from a flow position of the plug, at which the upstream opening is in fluid communication with the housing inlet opening, and the downstream opening is in fluid communication with the outlet opening of the outlet connector, to a sealed position of the plug at which neither the upstream opening nor the downstream opening is in fluid communication with the housing inlet opening,
wherein, the plug outer peripheral wall comprises a seal protrusion topped by a ridge and forming a closed loop defining a blank area of the plug outer peripheral wall, such that, in the sealed position, the housing inlet opening of the housing peripheral wall faces the blank area and is circumscribed within the seal protrusion.

In order to further tighten the stopcock in the flow position, the plug outer peripheral wall further comprises a flow protrusion topped by a ridge circumscribing the upstream opening such that, in the flow position, the inlet opening of the cylindrical chamber peripheral wall is circumscribed by the flow protrusion. The flow protrusion preferably shares a common portion of protrusion with the seal protrusion such that the inlet opening of the housing peripheral wall is at all times circumscribed by either the flow protrusion or the seal protrusion. For example, it is preferred that the flow protrusion has a circular or elliptical geometry, and the seal protrusion has a shape of a "C", with the free ends of the "C" contacting the flow protrusion.

The outlet connector comprises an outlet opening that, in an embodiment of the present invention, can open at the housing peripheral wall. The outlet connector then preferably extends externally transverse (e.g., radially) to the longitudinal z-axis. With the outlet opening located in the housing peripheral wall, it is preferred that the plug outer peripheral wall further comprises a downstream protrusion topped by a ridge circumscribing the downstream opening such that, in the flow position, the outlet opening of the housing peripheral wall is circumscribed within the downstream protrusion. With both inlet opening and outlet opening located on the housing peripheral wall, the through channel can extend from the upstream to the downstream openings as a straight through channel or, alternatively, as a through channel comprising a curve. The centroids of the inlet opening and outlet opening of the inner surface of the housing peripheral wall can be arranged on a plane normal to the longitudinal z-axis or, alternatively, can be arranged at two different levels in the z-axis direction.

In an alternative embodiment, the downstream opening of the through channel opens at one wall of the plug which is transverse to the housing peripheral wall, In this embodiment, the through channel may be straight, but it usually comprises a bend to fluidly connect the upstream and downstream openings thereof. The outlet connector then preferably extends substantially parallel to, preferably coaxially with the longitudinal z-axis. If the outlet connector extends substantially coaxially with the longitudinal z-axis, the rotation of the plug about said z-axis does not displace the outer connector, but simply rotates it about the same z-axis.

In use in a dispensing appliance, the housing inlet opening can be connected to the upstream portion of the dispensing tube, preferably by means of an inlet connector. The outlet connector is preferably either coupled to the downstream portion of the liquid dispensing tube or forms the downstream portion of the dispensing tube. The stopcock and liquid dispensing tube can then be arranged in the tapping column of a beverage dispensing apparatus, wherein the upstream portion of the liquid dispensing tube is coupled to a beverage container, preferably a pressurized container containing beer or another malt based fermented beverage.

Depending on the process used to produce a stopcock according to the present invention, the housing portion and the plug may be made of different materials. Reinforced or not polymers are preferred, such as for example PE, PP, PA, POM, PC, ABS, PET, and the like. The material of the inner surface of the housing peripheral wall preferably has a A-Shore hardness measured according to ASTM D2240 which is lower than the one of the material of the seal protrusion. For ease of production, it is preferred that the seal protrusion is integrally moulded with the plug and is made of the same material as the plug peripheral wall.

The present invention also concerns a beverage dispensing unit for dispensing a beverage contained in a container, said beverage dispensing unit comprising:
 (a) A compartment for holding a beverage container;
 (b) A source of pressurized gas connectable to a beverage container;
 (c) A dispensing tube comprising,
  (i) an upstream portion comprising a first end connectable to a beverage container and a second end connected in fluid communication with the inlet opening of a stopcock as defined above; and
  (ii) a downstream portion connected to or formed by the outlet connector of the stopcock, and
 (d) A dispensing tap comprising actuating means for rotating the plug from the sealed position to the flow position of the stopcock, and back.

A stopcock according to the present invention can be cost-effectively produced by two alternative processes. In a first embodiment, the process comprises the following steps:
 (a) injection moulding a plug as defined above;
 (b) injecting over the thus injection moulded plug a housing portion as defined above in a position such that seal protrusion is remote from the inlet opening of the housing peripheral wall; and
 (c) rotating the plug about the longitudinal z-axis, such as to bring the blank area or the upstream opening of the through channel vis-à-vis the housing inlet opening of the housing peripheral wall.

In a second embodiment, the process comprises the following steps:
 (a) injection moulding a housing portion (11) as defined in claim 1(a);
 (b) injecting into the chamber (11c) of the thus injection moulded housing portion a plug (21) as defined in claim 1(c)&(d) in a position such that the seal protrusion (22s) is remote from the inlet opening of the housing peripheral wall and
 (c) rotating the plug about the longitudinal z-axis, such as to bring the blank area (23s) or the upstream opening (23u) of the through channel (23) vis-à-vis the housing inlet opening of the housing peripheral wall

BRIEF DESCRIPTION OF THE FIGURES

For a fuller understanding of the nature of the present invention, reference is made to the following detailed description taken in conjunction with the accompanying drawings in which:

FIG. 3: shows a top cut view of (a) a housing and (b) a plug of a stopcock according to the prior art (e.g., FR1290315).

FIG. 4: shows the relative position of the upstream opening of the through channel of the plug with respect to the blank area defined by the seal protrusion in the prior art stopcock of FIG. 3.

DETAILED DESCRIPTION OF THE INVENTION

Figure 1:
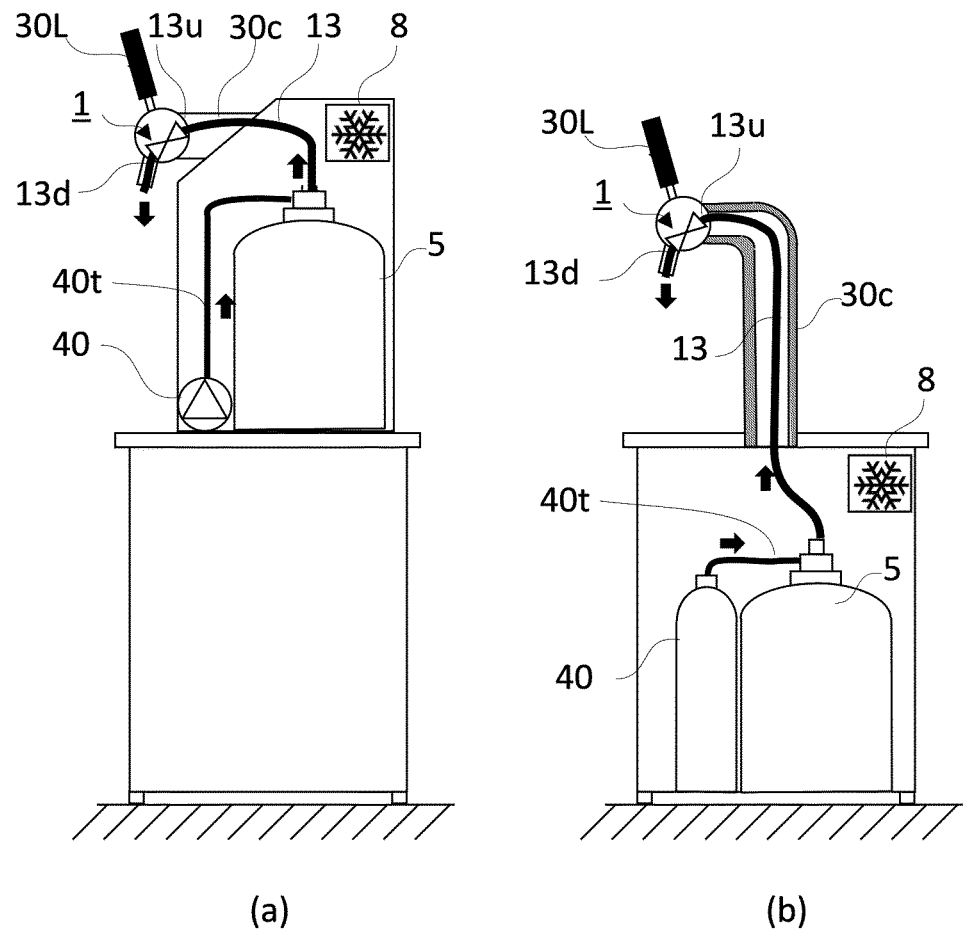
FIG. 1: shows beverage dispensing appliances comprising a stopcock according to the present invention (a) counter top dispenser, (b) under the counter dispenser.
Figure 2:
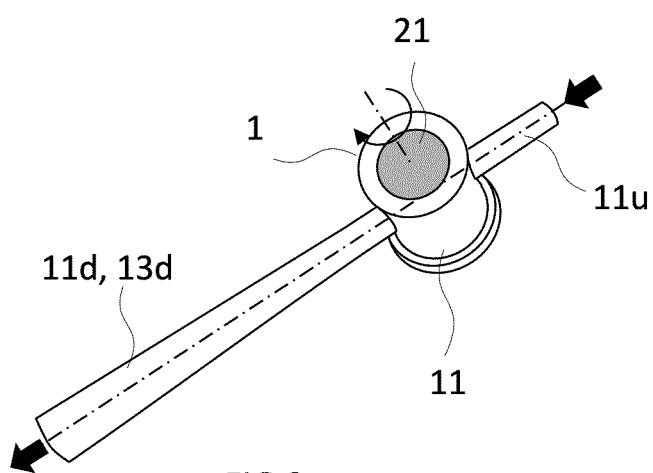
FIG. 2: shows an external view of a stopcock according to the present invention.

As illustrated in FIG. 1, a beverage dispensing unit in which a stopcock according to the present invention can be used comprises compartment for holding a beverage container (5). The size of the compartment depends on the size of the container (5) it is designed to enclose. In counter top dispensers, the compartment is laid directly on top of a counter or a table as illustrated in FIG. 1(a). For larger capacity containers or fir storage of multiple containers, under the counter dispensers are more suitable, wherein the compartment is located under a counter or a table, as illustrated in FIG. 1(b). The compartment may comprise refrigerating means (8) to bring the beverage contained in the container (5) to an optimal serving temperature which, for most beverages, is below room temperature (RT=20-23° C.).

A dispensing unit according to the present invention comprises a source of pressurized gas (40). The source of pressurized gas can be a bottle of pressurized gas, such as carbon dioxide or nitrogen, as illustrated in FIG. 1(b) or an air compressor (or air pump) as illustrated in FIG. 1(a). An air pump can only be used with beverages which are not too sensitive to contact with air or with containers of the bag-in-container type. The source of pressurized gas (40) can be stored within the compartment or outside. It is connected to the container by a gas tube (40t) coupled to the container by means of any keg connector known in the art.

A dispensing tube (23) comprises an upstream portion (23u) with a first end connectable to a beverage container (5) by means of any keg connector known in the art, and a second end connected in fluid communication with the inlet opening of a stopcock (1) according to the present invention. The dispensing tube comprises a downstream portion (23d) and is either formed by the outlet connector or coupled thereto, and has a free end for dispensing the liquid contained in the container. The stopcock (1) connecting the upstream and downstream portions of the dispensing tube (13) is engaged in a dispensing tap comprising actuating means (30L) for rotating the plug (21) from the sealed position to the flow position of the stopcock, and back. The actuating means are preferably in the form of a lever (30L) that can be rotated as is well known in draught beer taps commonly used in pubs. Other actuating means can be used instead, such as a rotating knob.

Figure 7:
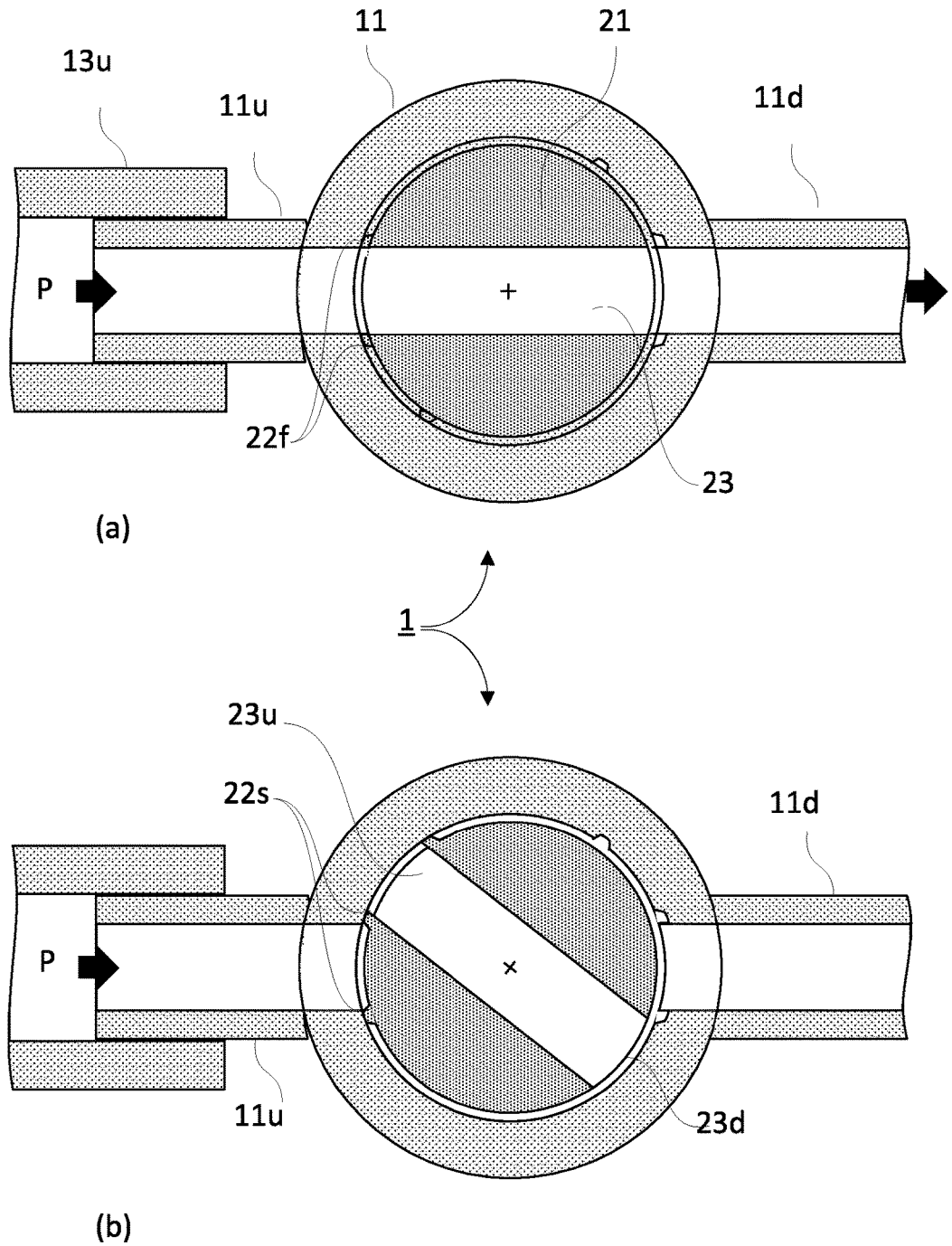
FIG. 7: shows a top cut view of a stopcock according to the present invention (a) in its flow position and (b) in its sealed position by rotation of the plug which comprises a straight through-channel.
Figure 8:
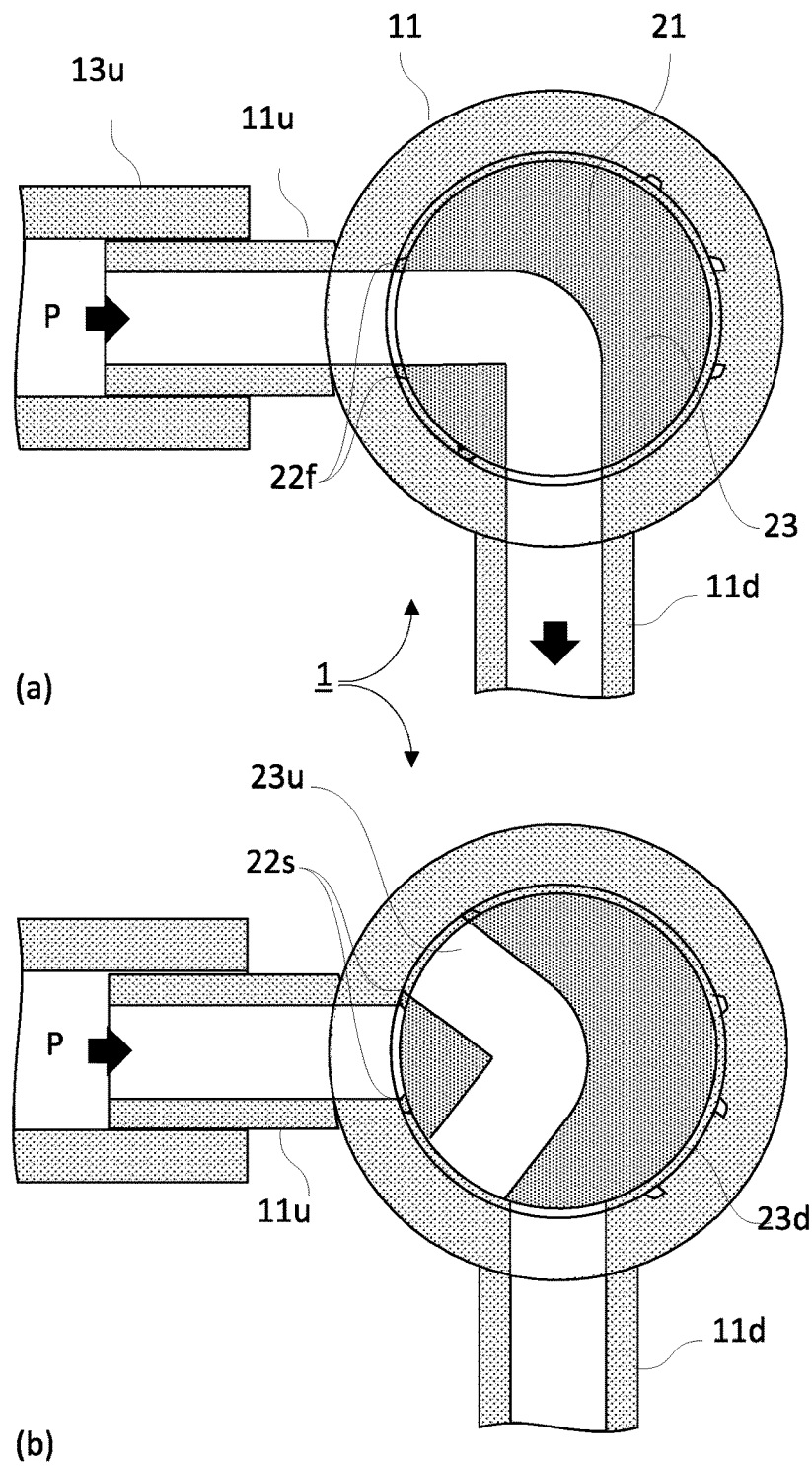
FIG. 8: shows a top cut view of a stopcock according to the present invention (a) in its flow position and (b) in its sealed position by rotation of the plug which comprises a curved through-channel.
Figure 9:
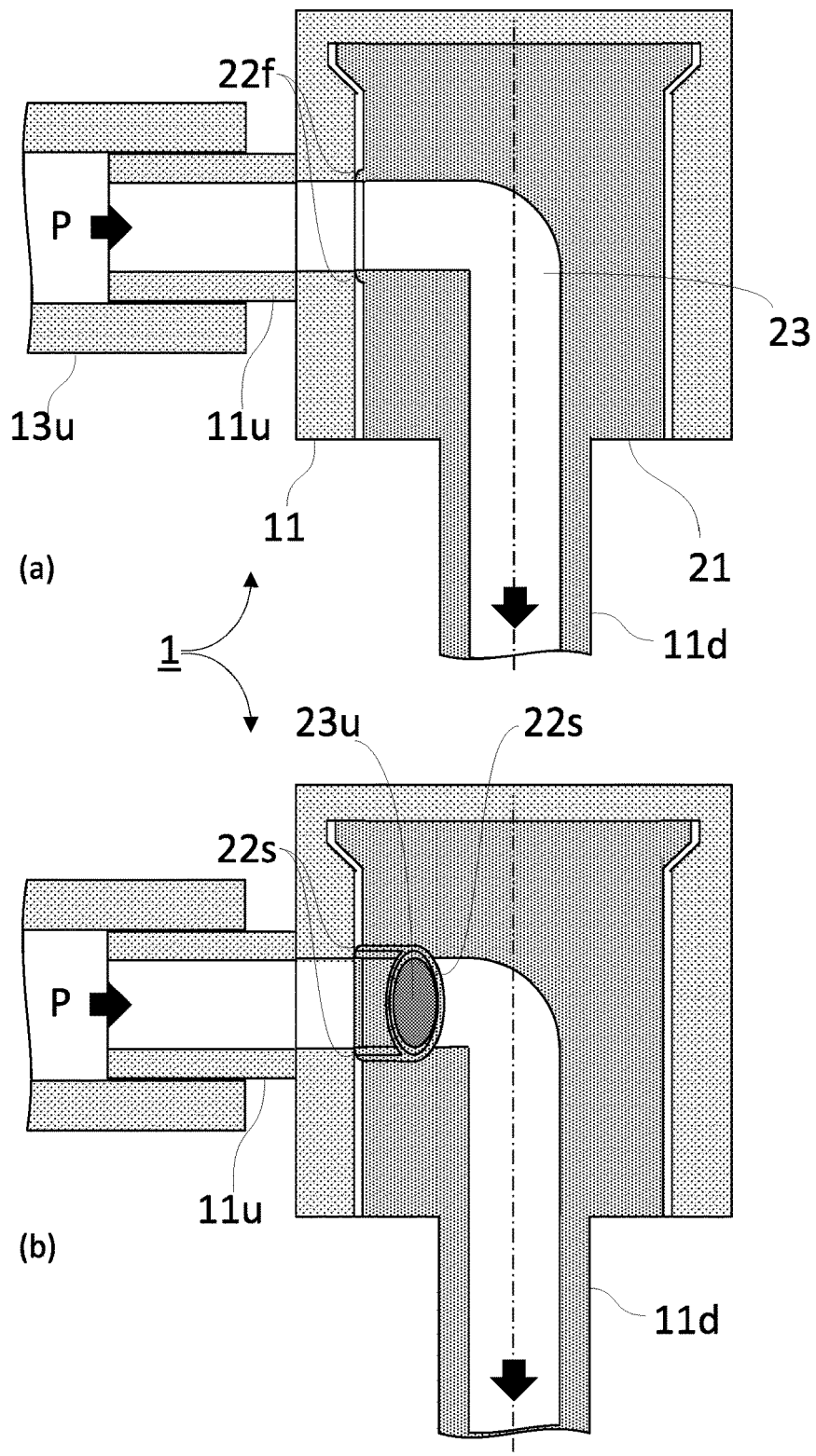
FIG. 9: shows a side cut view of a stopcock according to the present invention (a) in its flow position and (b) in its sealed position by rotation of the plug which comprises a curved through-channel having a downstream opening oriented coaxially with the longitudinal z-axis.

A stopcock (1) according to the present invention comprises a housing portion (11) comprising a chamber (11c) defined by a housing peripheral wall surrounding a longitudinal z-axis. The housing peripheral wall has a thickness separating an outer surface from an inner surface of revolution about said longitudinal z-axis. Ignoring minor structured features, such as small protrusion, recesses or openings, at least a central portion of the inner surface of revolution of the peripheral wall can define a cylinder, a cone, or a truncated cone. Said central portion can be flanked on one or both sides by end-portions of larger diameter then the adjacent part of the central portion, forming e.g., the negative print of a spool like geometry. The housing peripheral wall also comprises a housing inlet opening running through the thickness of the housing peripheral wall from the outer surface to the inner surface thereof. Said inlet opening can be or is connected to the upstream portion (13u) of the dispensing tube (13). The stopcock also comprises an outlet connector (11d) connectable to or forming the downstream portion (13d) of the dispensing tube and comprising an outlet opening. Like the inlet opening, the outlet opening can be located on the housing peripheral wall, running from the inner surface to the outer surface of the peripheral wall, as illustrated in FIGS. 3 to 8, but this is not necessarily the case as illustrated in FIG. 9.

The stopcock (1) comprises a plug (21) defined by a plug outer peripheral wall snugly fitting at least a portion of the inner surface of revolution of the housing peripheral wall, such that the plug can rotate within the chamber (11c) about said longitudinal z-axis. The plug comprises a through-channel (23) at least partially transverse to the longitudinal z-axis, extending from an upstream opening (23u) located on the plug outer peripheral wall, to a downstream opening (23d), such that the plug can be rotated about the longitudinal z-axis from a flow position of the plug (21), at which the upstream opening (23u) is in fluid communication with the housing inlet opening, and the downstream opening (23d) is in fluid communication with the outlet opening of the outlet connector (11d), to a sealed position of the plug at which neither the upstream opening (23u) nor the downstream opening (23d) is in fluid communication with the housing inlet opening.

In order to ensure fluid tightness of the stopcock in its sealed position at the pressure used in beverage dispensing units of the order of 0.5 to 1.5 bar above atmospheric, the plug outer peripheral wall comprises, as illustrated in FIGS. 3 to 6, a seal protrusion (22s) topped by a ridge and forming a closed loop defining a blank area (23s) of the peripheral wall, such that, in the sealed position, the housing inlet opening of the housing peripheral wall faces the blank area (23s) and is circumscribed within the seal protrusion. The seal protrusion (22s) may have any closed loop geometry, as long as it permits to fully circumscribe the inlet opening of the housing peripheral wall. It can be circular, elliptical, polygonal, or a combination of the preceding geometries.

Figure 10:
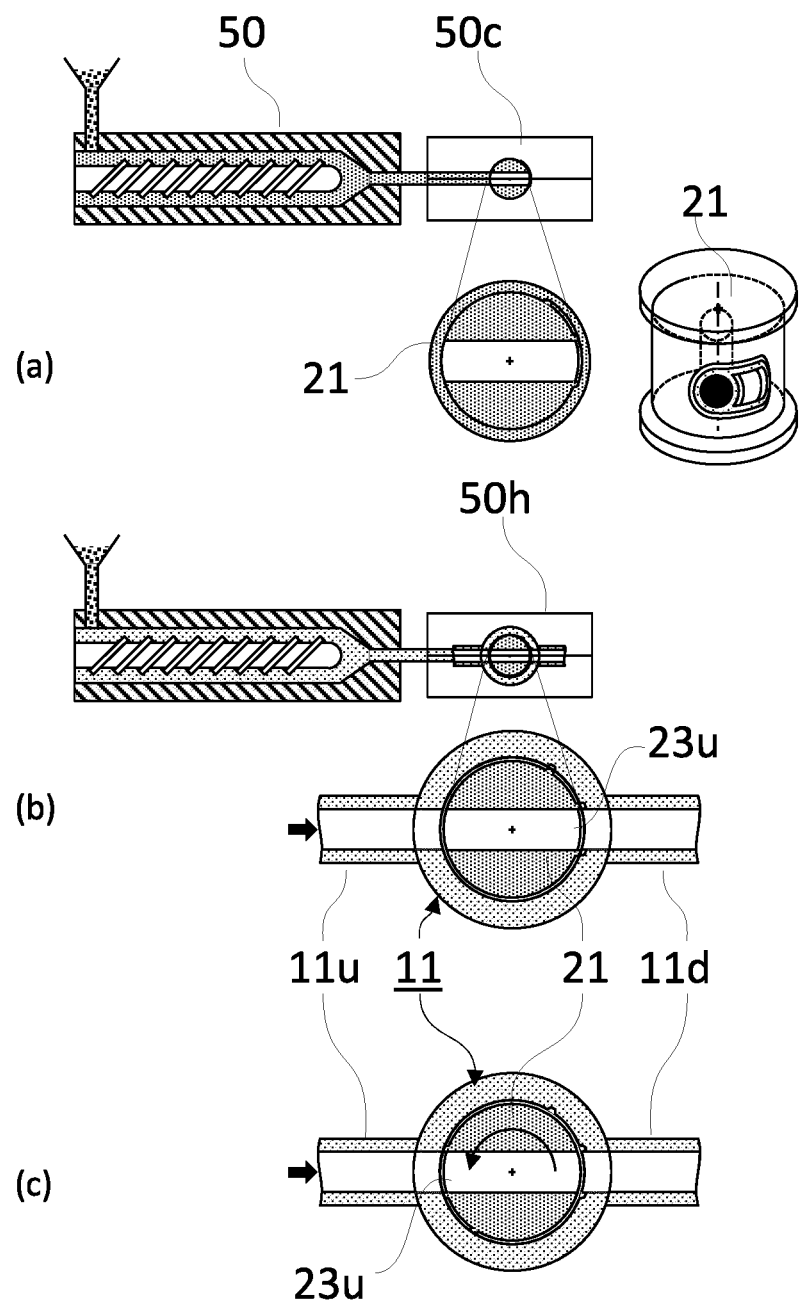
FIG. 10: shows process steps for the production of (a) a housing portion (b) a plug injection moulded into the chamber of the housing portion, and (c) rotation of the plug.

A ridge topping the seal protrusion is advantageous because it applies a higher stress onto the inner surface of the housing peripheral wall, thus increasing the sealing effect. For production reasons, addressed below, it may be advantageous that the plug and housing be made of different materials or, at least, materials having different melting temperatures. The plug and housing peripheral wall can be made of any polymer suitable for being injection moulded. For recycling reasons, which are important for disposable stopcocks, it is preferred if they are made of polymers, in particular thermoplastic polymers such as PE, PP, PA, POM, PC, PS, PET, and the like. The materials used can be different polymer types, or different grades of a same material, having different melting temperatures. In one embodiment illustrated in FIG. 10, it is advantageous if the material of the housing peripheral wall have a lower hardness than the seal protrusion (22s) such that the ridge of the seal protrusion may deform slightly the inner surface of the housing peripheral wall and thus further enhance fluid tightness of the stopcock. In yet a preferred embodiment, the seal protrusion (22s) is integrally moulded with, and is made of the same material as the plug (21). In this case it is preferred that the plug be harder than the housing peripheral wall. The hardnesses of the housing peripheral wall and of the plug can be characterized e.g., by performing the A-Shore test according to ASTM D2240, but any recognized hardness test can be used to determine which of the plug or the housing peripheral wall has a higher hardness.

A stopcock (1) according to the present invention is very simple, reliable, and has such low production cost that it can be made disposable. Stopcocks are used to bring in or out of fluid communication an upstream and a downstream portion of a dispensing tube. The stopcock can be designed such that an upstream and/or a downstream portion of the dispensing tube can be reversibly connected by an end user to the stopcock. For disposable uses, it is preferred, however, that the upstream and downstream portions of the dispensing tube are irreversibly connected to the stopcock in plant, and after use of the container, the stopcock is disposed of together with the dispensing tube. If the downstream portion of the dispensing tube is short, it can be moulded as an integral part of the stopcock housing or plug as a tubular connector (11d). Else, the downstream and upstream portions of the dispensing tube (23) can be glued or welded to downsteam and upstream connectors (11d, 11u), respectively.

Figure 5:
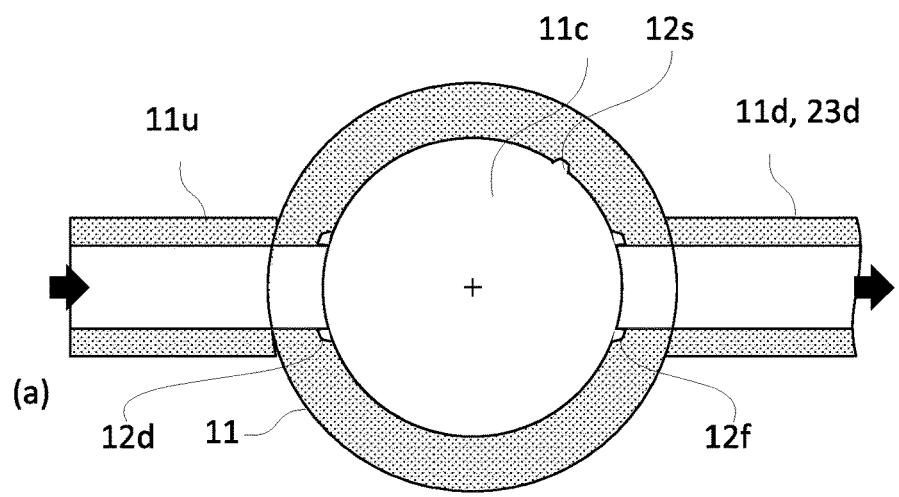
FIG. 5: shows a top cut view of (a) a housing and (b) a plug of a second embodiment of stopcock according to the present invention.
Figure 5:
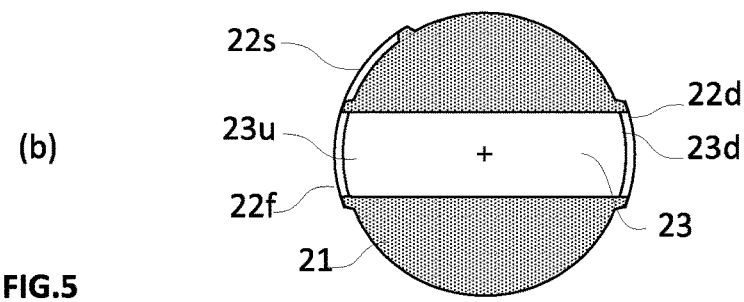
Figure 6:
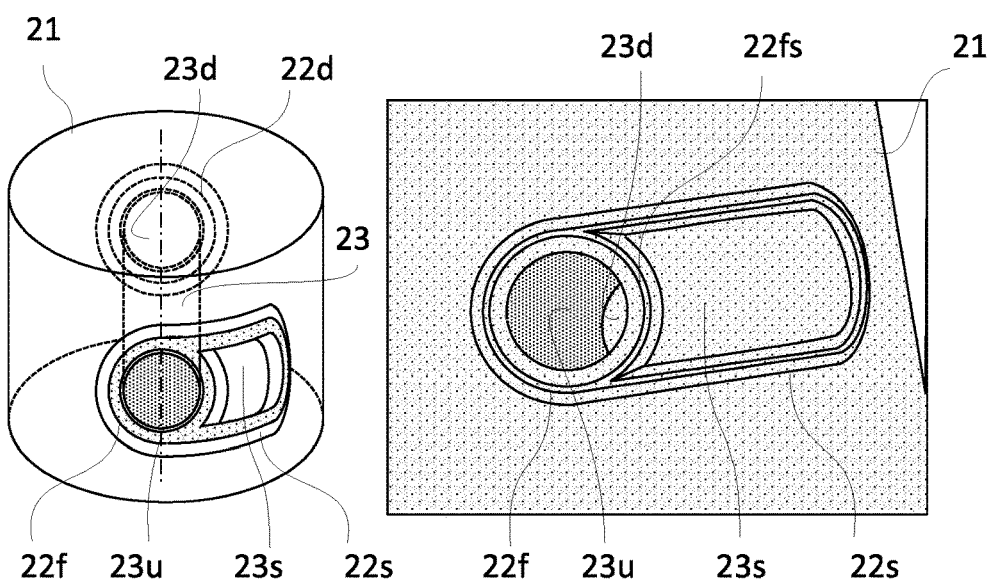
FIG. 6: shows the relative position of the upstream opening of the through channel of the plug with respect to the seal protrusion and flow protrusion in the embodiment of FIG. 5.

The plug outer peripheral wall of a stopcock according to the present invention further comprises a flow protrusion (22f) topped by a ridge circumscribing the upstream opening (23u) such that, in the flow position, the inlet opening of the cylindrical chamber peripheral wall circumscribed by the flow protrusion (22f). A flow protrusion (22f) is not necessarily required. It can either be replaced by an O-ring between the housing portion and an end-surface of the plug, which is transverse to the plug peripheral wall or, in case of low pressures, it may not be required at all, because the liquid finds it easier to flow through the through channel (23) than through the very thin slit formed between the plug peripheral wall and the inner surface of the housing peripheral wall. FIGS. 5&6 show a stopcock according to the present invention, whilst FIGS. 3&4 show a stopcock according to the prior art, such as FR1290315, which has groove 12c and which lacks a flow protrusion (22f) as illustrated in FIGS. 5&6, which ensures an enhanced fluid tightness to stopcocks of the present invention with respect to prior art stopcocks, also in the open, flowing position of the stopcock.

The flow protrusion (22f) and the seal protrusion (22s) may be separated from one another. It is preferred, however, that as illustrated in FIGS. 5&6, the flow protrusion (22f) shares a common portion (22fs) of protrusion with the seal protrusion (22s). This is advantageous, because then the inlet opening is at all-time surrounded by either the seal protrusion (22s) or the flow protrusion (22f) regardless of whether the plug is in the seal position, the flow position, or at any position between these two. For example, as illustrated in FIG. 6, the flow protrusion (22f) can have a circular or elliptical geometry, and the seal protrusion (22s) may have a shape of a "C" encased in the flow protrusion, with the free ends of the "C" contacting the flow protrusion. The common portion (22fs) is the portion of the circular or elliptical flow protrusion (22f) comprised between the free ends of the C-shaped seal protrusion. In all cases, whether in contact with one another or separate, the seal protrusion (22s) and the flow protrusion (22f) are arranged on the plug outer peripheral wall such that by rotation of the plug about the longitudinal z-axis, the inlet opening of the housing peripheral wall alternatively:
- faces the blank area (23s) and is circumscribed within the seal protrusion (22s) (=sealed position), or
- faces the upstream opening (23u) of the through channel (23) and is circumscribed within the flow protrusion (23f) (=flow position).

In one embodiment, the outlet opening of the outlet connector opens at the housing peripheral wall. This is illustrated in FIGS. 3, 5, 7, and 8. If the plug in this embodiment comprises a flow protrusion (22f), it is advantageous to also provide a downstream protrusion (22d) topped by a ridge circumscribing the downstream opening (23d) such that, in the flow position, the outlet opening of the housing peripheral wall is circumscribed by the downstream protrusion (22d). The through channel (23) may extends straight from the upstream opening (23u) to the downstream opening (23d). In this case it preferably extends normal to, and intercepts the longitudinal z-axis as shown in FIGS. 3, 5, and 7. Alternatively, the through channel (23) may extend with a curve between the upstream opening (23u) and the downstream opening (23d) as illustrated in FIG. 8. Regardless of the geometry of the through channel (23), it can be seen by comparing (a) and (b) in FIGS. 7 and 8, that rotating the plug (21) permits to bring the upstream and downstream openings (23u, 23d) of the through channel (23) in or out of registry with the inlet and outlet openings of the housing peripheral wall, respectively, thus passing from the flow position to the seal position.

In a preferred embodiment illustrated in FIG. 9, the downstream opening (23u) of the through channel opens at an end wall of the plug which is transverse to the housing peripheral wall. If the downstream opening (23u) is coaxial with the longitudinal z-axis, the outlet connector (11d) may too extend substantially coaxially with the longitudinal z-axis and be permanently fixed to said transverse end wall of the plug. In a preferred embodiment, the outlet connector (11d) is integrally moulded with the plug (23). This embodiment is of course very advantageous in that there is no tightness issue between the through channel (23) and the outlet connector (11d) and thus with the downstream portion (23d) of the dispensing tube (23). No downstream protrusion (22d) is needed.

The housing inlet opening can be connected to the upstream portion (13u) of the dispensing tube (13 by means of an inlet connector (11u). Depending on whether the upstream portion (13u) of the dispensing tube (13) is to be coupled to the stopcock by the end user or is coupled thereto in plant, the inlet connector (11u) may have different geometries. It will generally have a tubular geometry extending outwards from the housing outer surface of the peripheral wall, transverse to the longitudinal z-axis. The outlet connector (11d) can either be coupled to the downstream portion (13d) of the liquid dispensing tube (13) or form the downstream portion (13d) of the dispensing tube (13).

As shown in FIG. 1, a stopcock according to the present invention is particularly suitable for being arranged in the tapping column (30c) of a beverage dispensing apparatus, either counter top dispenser or under the counter dispenser. The upstream portion (13u) of the liquid dispensing tube (13) is then coupled to a beverage container (5), preferably a pressurized container containing beer or a malt based fermented beverage. As discussed above, the container can advantageously be a bag-in-container. This allows the use of a simple air pump for pressurizing the container and thus driving the dispensing of the liquid contained therein.

A stopcock according to the present invention can be produced by one of the following processes. In a first embodiment, illustrated in FIG. 10, the process comprises the following steps:
(a) injection moulding a plug (21) as described above (cf. FIG. 10(a));
(b) injecting over the thus injection moulded plug a housing portion (11) as described above in a position such that seal protrusion (22s) is remote from the inlet opening of the housing peripheral wall (cf. FIG. 10(b)); and
(c) rotating the plug about the longitudinal z-axis, such as to bring the blank area (23s) or the upstream opening (23u) of the through channel (23) vis-à-vis the housing inlet opening of the housing peripheral wall (cf. FIG. 10(c)).

The thus injection moulded stopcock can be extracted from the tool either between steps (b)&(c), or after step (c). In this embodiment it is preferred that the plug (21) be made of a polymer having a melting temperature or softening temperature higher than the one of the polymer of the housing peripheral wall. If both inlet opening and outlet opening are located in the inner surface of the housing peripheral wall or, in other words, if both upstream opening (23u) and downstream opening (23d) of the through channel

(23) are located on the plug peripheral wall, as illustrated in FIGS. 7&8, then it is preferred that in step (b) of the foregoing process, the housing portion (11) is injection moulded over the plug (21) such that the upstream opening (23u) of the through channel (23) is in fluid communication with the tubular outlet connector (11d), and wherein in step (d) the plug is rotated to bring the upstream opening (23u) of the through channel in fluid communication with the tubular inlet connector (11u) (cf. FIG. 10(c)). In case of a straight through channel as in FIG. 7, the plug is rotated by an angle of 180°. In case of a through channel comprising a bend as in FIG. 8, then the rotation angle will depend on the geometry of the stopcock.

Figure 11:
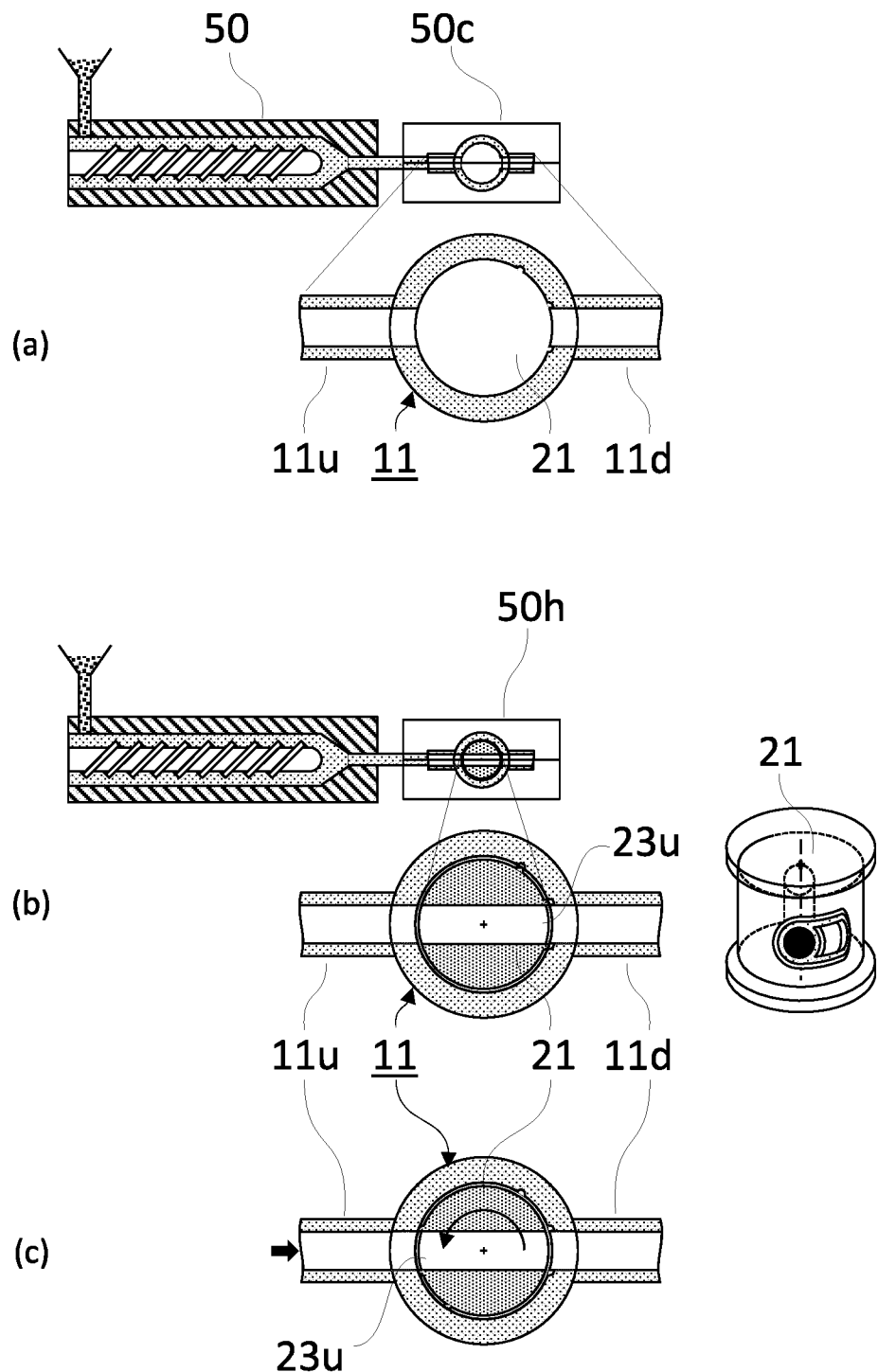
FIG. 11: shows process steps for the production of (a) a plug (b) a housing portion injection moulded over the plug, and (c) rotation of the plug.

In an alternative process illustrated in FIG. 11, a stopcock according to the present invention can be produced by first injection moulding the housing and thereafter injection moulding the plug inside the chamber of the housing with the following steps:
  (a) injection moulding a housing portion (11) (cf. FIG. 11(a));
  (b) injecting into the chamber (11c) of the thus injection moulded housing portion a plug (21) as described above in a position such that seal protrusion (22s) is remote from the inlet opening of the housing peripheral wall (cf. FIG. 11(b)); and
  (c) rotating the plug about the longitudinal z-axis, such as to bring the blank area (23s) or the upstream opening (23u) of the through channel (23) vis-à-vis the housing inlet opening of the housing peripheral wall (cf. FIG. 11(c)).

Like in the former embodiment, the thus injection moulded stopcock can be extracted from the tool either between steps (b)&(c), or after step (c). In this embodiment it is preferred that the plug (21) be made of a polymer having a melting temperature or softening temperature lower than the one of the polymer of the housing peripheral wall.

| REF | DESCRIPTION |
|---|---|
| 1 | stopcock |
| 5 | liquid container, beverage keg |
| 8 | refrigerating means |
| 11 | Housing portion of the valve |
| 11c | chamber of the housing portion of the valve |
| 11d | outlet connector of housing portion of the valve |
| 11u | inlet connector of housing portion of the valve |
| 12d | groove produced by the downstream protrusion (22d) upon moulding of the housing portion of the valve |
| 12f | groove produced by the flow protrusion (22f) upon moulding of the housing portion of the valve |
| 12s | groove produced by the seal protrusion (22s) upon moulding of the housing portion of the valve |
| 13 | liquid dispensing tube |
| 13d | downstream portion of the liquid dispensing tube (with respect to valve) |
| 13u | upstream portion of the liquid dispensing tube (with respect to valve) |
| 21 | rotary plug of the valve |
| 22d | flow protrusion surrounding the outlet opening (23d) of the plug channel (23) |
| 22f | flow protrusion surrounding the inlet opening (23u) of the plug channel (23) |
| 22fs | portion of protrusion common to the flow and seal protrusions |
| 22s | seal protrusion surrounding a blank area |
| 23 | through channel extending through the valve plug |
| 23d | downstream opening of valve plug channel |
| 23s | blank area defined by seal protrusion |
| 23u | upstream opening of valve plug channel |
| 30c | tapping column |
| 30L | lever actuating the opening/closing of the stopcock |
| 40 | source of pressurized gas |
| 40t | gas tube |
| 50 | injection moulding screw |
| 50c | mould for the core portion of the valve |
| 50h | mould for the housing portion of the valve |

The invention claimed is:

1. A beverage dispensing unit for dispensing a beverage contained in a container, said beverage dispensing unit comprising:
  (a) a compartment for holding a beverage container,
  (b) a source of pressurized gas connectable to the beverage container,
  (c) a stopcock for allowing or stopping the flow of a liquid under pressure through a dispensing tube comprising an upstream portion separated from a downstream portion by the stopcock to which they are both connected, said stopcock comprising:
    (1) a housing portion comprising a chamber defined by a housing peripheral wall surrounding a longitudinal z-axis, said housing peripheral wall comprising an inner surface of revolution about said longitudinal z-axis, said housing peripheral wall comprising a housing inlet opening connectable to the upstream portion of the dispensing tube,
    (2) an outlet connector connectable to the downstream portion of the dispensing tube and comprising an outlet,
    (3) a plug defined by a plug outer peripheral wall snugly fitting the inner surface of revolution of the housing peripheral wall, such that the plug can rotate within the chamber about said longitudinal z-axis, said plug comprising:
    (4) a through-channel at least partially transverse to the longitudinal z-axis, extending from an upstream opening located on the plug outer peripheral wall, to a downstream opening located on the plug outer peripheral wall, such that the plug can be rotated about the longitudinal z-axis from a flow position of the plug, at which the upstream opening is in fluid communication with the housing inlet opening while the downstream opening is in fluid communication with the outlet opening of the outlet connector, to a sealed position of the plug at which neither the upstream opening nor the downstream opening is in fluid communication with the housing inlet opening, wherein
    (5) the plug outer peripheral wall comprises a seal protrusion topped by a ridge and forming a closed loop defining a blank area of the plug outer peripheral wall, such that, in the sealed position, the housing inlet opening of the housing peripheral wall faces the blank area and is circumscribed within the seal protrusion,
  wherein the plug outer peripheral wall further comprises a flow protrusion topped by a ridge circumscribing the upstream opening such that, in the flow position, the inlet opening of the cylindrical chamber peripheral wall is circumscribed by the flow protrusion, wherein said flow protrusion shares a common portion of protrusion with the seal protrusion,
  (d) a dispensing tube comprising:

an upstream portion comprising a first end connectable to a beverage container and a second end connected in fluid communication with the inlet opening of the stopcock, while a downstream portion is connected to the outlet connector of the stopcock, and (e) a dispensing tap comprising actuating means for rotating the plug from the sealed position to the flow position of the stopcock, and back.

2. The beverage dispensing unit according to claim 1, wherein the outlet connector of the stopcock comprises the outlet opening that opens at the housing peripheral wall and the outlet connector extends externally transverse to the longitudinal z-axis.

3. The beverage dispensing unit according to claim 2, wherein the plug outer peripheral wall of the stopcock further comprises a downstream protrusion topped by a ridge circumscribing the downstream opening such that, in the flow position, the outlet opening of the housing peripheral wall is circumscribed by the downstream protrusion.

4. The beverage dispensing unit according to claim 1, wherein the through channel of the stopcock extends straight from the upstream opening to the downstream opening, and extends normal to, and intercepts the longitudinal z-axis.

5. The beverage dispensing unit according to claim 1, wherein the through-channel of the stopcock extends with a curve between the upstream opening and the downstream opening.

6. The beverage dispensing unit according to claim 5, wherein the downstream opening of the through channel of the stopcock opens at one wall of the plug which is transverse to the housing peripheral wall, and wherein the outlet connector extends substantially parallel to, coaxially with the longitudinal z-axis.

7. The beverage dispensing unit according to claim 1, wherein the flow protrusion of the stopcock has a circular or elliptical geometry, and the seal protrusion has a shape of a "C," with the free ends of the "C" contacting the flow protrusion.

8. The beverage dispensing unit according to claim 1, wherein the housing inlet opening of the stopcock is connected to the upstream portion of the dispensing tube, by means of an inlet connector, and the outlet connector is either coupled to the downstream portion of the liquid dispensing tube or forms the downstream portion of the dispensing tube.

9. The beverage dispensing unit according to claim 8, wherein the stopcock is arranged in a tapping column of the beverage dispensing apparatus unit, wherein the upstream portion of the liquid dispensing tube is coupled to the beverage container, a pressurized container containing a malt based fermented beverage.

10. The beverage dispensing unit according to claim 1, wherein the housing portion and the plug of the stopcock are made of different materials, made of reinforced or not polymer selected from the group consisting of PE, PP, PA, POM, PC, ABS, or PET, and the material of the inner surface of the housing peripheral wall has an A-Shore hardness measured according to ASTM D2240 which is lower than the one of the material of the seal protrusion.

11. The beverage dispensing unit according to claim 1, wherein the seal protrusion of the stopcock is integrally moulded with the plug and is made of the same material as the plug peripheral wall.

\* \* \* \* \*